United States Patent
De Lutiis et al.

(10) Patent No.: US 8,572,382 B2
(45) Date of Patent: Oct. 29, 2013

(54) OUT-OF BAND AUTHENTICATION METHOD AND SYSTEM FOR COMMUNICATION OVER A DATA NETWORK

(75) Inventors: Paolo De Lutiis, Turin (IT); Corrado Moiso, Turin (IT); Gaetano Di Caprio, Turin (IT)

(73) Assignee: Telecom Italia S.p.A., Milan (IT)

( * ) Notice: Subject to any disclaimer, the term of this patent is extended or adjusted under 35 U.S.C. 154(b) by 813 days.

(21) Appl. No.: 12/227,281

(22) PCT Filed: May 15, 2006

(86) PCT No.: PCT/EP2006/004555
§ 371 (c)(1),
(2), (4) Date: Jan. 5, 2009

(87) PCT Pub. No.: WO2007/131523
PCT Pub. Date: Nov. 22, 2007

(65) Prior Publication Data
US 2009/0210707 A1    Aug. 20, 2009

(51) Int. Cl.
*H04L 9/32* (2006.01)
*H04L 1/00* (2006.01)
*H04N 7/167* (2011.01)

(52) U.S. Cl.
USPC ........... 713/170; 713/179; 380/203; 380/274; 726/22

(58) Field of Classification Search
USPC .............. 713/170, 179; 380/223, 274; 726/22
See application file for complete search history.

(56) References Cited

U.S. PATENT DOCUMENTS

| | | | | |
|---|---|---|---|---|
| 5,345,507 | A * | 9/1994 | Herzberg et al. | 380/28 |
| 6,009,176 | A * | 12/1999 | Gennaro et al. | 713/170 |
| 6,842,860 | B1 | 1/2005 | Branstad et al. | |
| 7,242,772 | B1 * | 7/2007 | Tehranchi | 380/223 |
| 7,627,121 | B1 * | 12/2009 | Reeds et al. | 380/260 |
| 2002/0066013 | A1 * | 5/2002 | Relander et al. | 713/151 |
| 2002/0094081 | A1 * | 7/2002 | Medvinsky | 380/44 |
| 2002/0095601 | A1 * | 7/2002 | Hind et al. | 713/201 |
| 2003/0026423 | A1 * | 2/2003 | Unger et al. | 380/217 |
| 2003/0120924 | A1 | 6/2003 | Immonen | |
| 2003/0149869 | A1 * | 8/2003 | Gleichauf | 713/153 |
| 2003/0156715 | A1 * | 8/2003 | Reeds et al. | 380/37 |
| 2004/0054912 | A1 * | 3/2004 | Adent et al. | 713/181 |
| 2004/0059939 | A1 * | 3/2004 | de Jong | 713/200 |
| 2005/0071639 | A1 * | 3/2005 | Rodgers et al. | 713/176 |
| 2005/0228983 | A1 | 10/2005 | Starbuck et al. | |
| 2007/0237145 | A1 * | 10/2007 | Adhikari et al. | 370/392 |

* cited by examiner

*Primary Examiner* — Michael Simitoski
(74) *Attorney, Agent, or Firm* — Finnegan, Henderson, Farabow, Garrett & Dunner, L.L.P.

(57) ABSTRACT

A method and system for out-of-band authentication of messages transmitted, e.g. as packets, on a communication network, whereby a first stream of data is received by a sender control module from a sender; the first stream of data is transmitted over a first channel, e.g. a non-secure data channel, toward a receiver control module; the sender control module generates authentication data of the first stream of data; the authentication data are transmitted from the sender control module to the receiver control module on a second channel, e.g. a secure data channel, distinct from the first channel; and a stream of data received by the receiver control module is checked using the authentication data. Before sending the authentication data, the sender control module transmits a control message including synchronization data to the receiver control module over the second channel.

20 Claims, 4 Drawing Sheets

OUT-OF BAND AUTHENTICATION METHOD AND SYSTEM FOR COMMUNICATION OVER A DATA NETWORK

CROSS REFERENCE TO RELATED APPLICATION

This application is a national phase application based on PCT/EP2006/004555, filed May 15, 2006.

TECHNICAL FIELD OF THE INVENTION

The present invention in general relates to the field of communication networks, and in particular to an out-of-band authentication method for streaming and discrete message communication across a data network. More particularly, the invention relates to a solution ensuring the integrity of the data and the authenticity of the parties of a connection for data exchange using a public packet-type communication network, e.g. an Internet Protocol (IP) network.

BACKGROUND ART

As is known, the use of systems implementing public packet-like communication networks, like the IP network, for data exchanging and/or multimedia streaming requires the use of security solutions able to ensure the integrity of the data and the authenticity of the parties in a connection.

The most used solutions for implementing such security measures generally provide for an extension of the existing communication protocols by virtue of the introduction of new portions (e.g. specific fields) or the modification of already existing fields within application protocols.

In general, every application protocol (such as SOAP-Simple Object Access Protocol; HTTP-HyperText Transfer Protocol; Java RMI-Java Remote Method Invocation; IIOP-Internet Inter-Orb Protocol) defines one or more fields whose content is defined according to the specific protocol. For example, SOAP, used in the invocation of web services, includes a "header" and a "body", used for describing the content of the transmitted message. A "secure" extension of SOAP, called WS-Security, introduces specific fields both for transmitting information about the identity of the invoking application (for example, in the header SOAP) and for ensuring the integrity of the request or the web-service invocation response (contained in the SOAP body).

The above approach cannot be always applied since it is not always possible to modify or extend the existing protocols or the applications using them ("legacy" applications) so as to add authentication and integrity information to the transmitted messages. Examples of protocols that cannot be modified are RTP (Real-Time Protocol), FTP (File Transfer Protocol), Telnet Protocol and many other protocols of the group TCP/IP-Transmission Control Protocol/Internet Protocol, since these protocols have been designed without taking into account any security requirements.

Other solutions for implementing security measures include using application protocols that are "secure" at a transport or at a network level (according to the International Standards Organization (ISO) Open System Interconnection (OSI)—ISO/OSI model). Examples of such solutions are SSL (Secure Socket Layer) or protocols providing secure tunnels, such as IPSEC (IPSecurity). This approach generally provides for message ciphering and authentication by encapsulating the original communications stream into messages of the secure communication protocol.

U.S. Pat. No. 6,842,860 discloses a solution using a partial message authentication code, wherein a message authentication code is applied to only some portions of the message.

US 2005/0228983 discloses a system including a secure side channel and a unsecured legacy channel. In one embodiment, a client hashes some of the content sent over the unsecured channel and sends the hash over the secure channel. The server then hashes the content received over the unsecured channel and compares the hash it generates to the one received over the secure channel to determine whether the message posted over the unsecured channel has been altered.

US 200370120924 discloses a method for checking the integrity of a message transmitted between a sender and a recipient. In the transmitted end, an authentication value is generated from a message to be sent. A check code is formed from the authentication value and a random string. The first message is transferred from the sender to the recipient through a first channel, and the check code is transferred through a second secure channel. In the receiving end an authentication check is formed based on the received message. The integrity of the received message is checked by comparing the check values in the receiving end.

OBJECT AND SUMMARY OF THE INVENTION

Applicant has observed that solutions using security mechanisms operating at transport or network level provide an end-to-end protection, but are less suited when transmitted messages should pass a plurality of intermediate nodes that need to access the transmitted information. Furthermore, such solutions are disadvantageous when it is important that no delay is introduced in the information stream transmission, such as in real-time communications, like Voice over IP, since any delay could deteriorate the service quality.

Furthermore, authentication methods including an off-line check on the authenticity of the messages, cannot be extended to real-time traffic or streaming, wherein dynamically generated messages are continuously sent (such as in VoiceIP).

Applicant has also observed that solutions using a message authentication code mechanisms applied to the transmitted messages often require a modification of the client and server applications to manage the modified messages, which is not always possible or desirable.

The aim of the present invention is therefore to provide a method and a system for message authentication that are able to overcome the above drawbacks of the known solutions.

Digital media can be transmitted across a network in a continuous flow, a method of content delivery known as streaming. The process of streaming starts when a media file is broken into smaller pieces so it can be transferred and played as each of the pieces is received, rather than waiting for the whole file to be transferred before playback starts. In general, data stream refer to a sequence of digitally encoded signals used to represent information in transmission.

Continuous media, such as real-time audio or video (e.g., Internet radio or TV stations), are generally transferred (e.g., downloaded) and played by using streaming technologies. Especially in case of continuous streaming, the length of the data stream carrying the information can be a priori unknown or, for the purposes of the management of the streaming, considered infinite.

Applicant has understood that, especially while dealing with continuous streaming, an authentication mechanism should enable synchronization between the sender of the information data and the receiver so that the receiver can define the data from which to start the verification even if the time at which the transmission of data has started is unknown to the receiver.

According to the present invention, there are provided a method and a system for out-of-band authentication of messages transmitted across a communication network, as defined in claims 1 and 14, respectively.

In particular, the method uses two different channels: a first one, which can be based on a packet-type communication network with limited secure characteristics, e.g., Internet, for transmitting data and or data streams (for example, multimedia and real-time data); and a second, which is preferably a secure one, for sending information usable to check the integrity and/or the authenticity of the received data. In particular, the authentication method can be used to verify data integrity, i.e., to verify that the data sent is the same data that is received, and/or it can be used for the origin authentication, i.e., for verifying that the data was actually sent by the claimed sender. In order to operate correctly on data streams, synchronization data are exchanged between a sender module and a receiver module. Thus, the sender and receiver modules can be synchronized, and the receiver module can perform the check operations in real-time.

BRIEF DESCRIPTION OF THE DRAWINGS

For a better understanding of the present invention, preferred embodiments, which are intended purely as examples and are not to be construed as limiting, will now be described with reference to the attached drawings, wherein.

DETAILED DESCRIPTION OF PREFERRED EMBODIMENTS OF THE INVENTION

Figure 1:
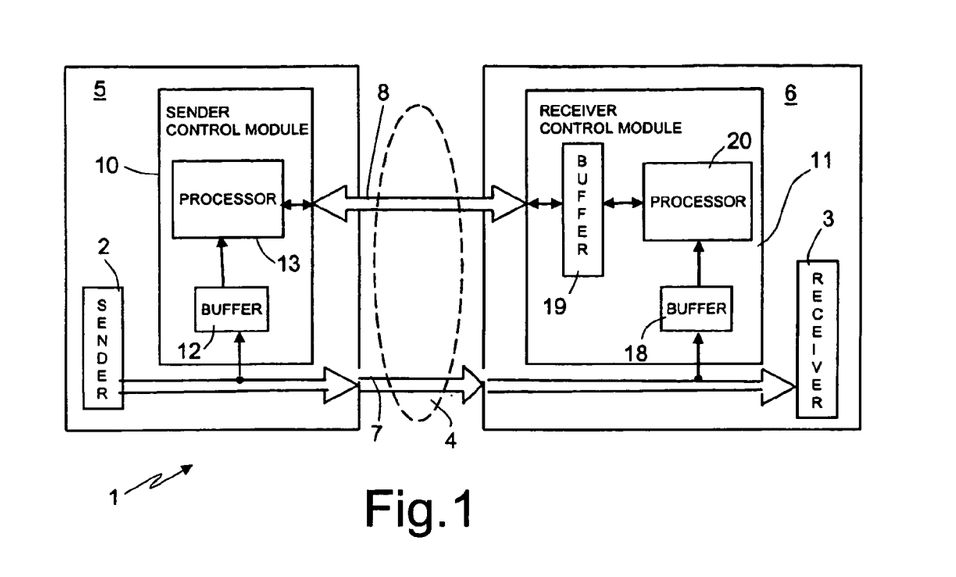
FIG. 1 shows a block diagram of an authentication system according to a first embodiment of the present invention.

FIG. 1 shows a system 1 for authenticating data transmitted by a sender 2 to a receiver 3 through a public network 4, according to a first embodiment of the present invention. In the embodiment of FIG. 1 ("edge solution"), the sender 2 and the receiver 3 are two communications nodes within a LAN (Local Area Network) 5, 6, respectively. For example, the sender 2 and the receiver 3 may be comprised in a business extranet network formed by different trusted LANs, controlled by a single central control unit and connected to each other through a wide area network (WAN), e.g., the Internet.

In particular, the sender 2 and the receiver 3 may be e.g., a computer, a PDA (Personal Digital Assistant), a laptop, a portable computer with wireless capability, a VoIP telephone, a Web cam or a wireless IP telephone.

The public network 4, e.g. the Internet, includes a first channel 7 and a second channel 8. First and second channels 7 and 8 are logical data channels not necessarily corresponding to different physical channels since a physical channel may be shared by more logical channels. Examples of physical channels can be cables or radio channels in case of mobile communication, such as Packet Data CHannels (PDCH) in GPRS, each channel being associated with a time slot of a TDMA frame.

First channel 7 is used for transmitting data, preferably packet data, either as discrete messages or as data streams (for example, multimedia and real-time data) and has unspecified (e.g., limited) security characteristics. Second channel 8 is preferably a secure channel and is implemented in any known way to transmit control data in a secure way. Security protocols that operate at application, at transport or at network level, e.g. it may be implemented through SSL (Secure Socket Layer) or IPSEC (IPSecurity) can be employed in the second channel 8.

Each communication node 5 and 6 includes a control module 10 and 11, respectively, connected to the sender 2 and, respectively, the receiver 3.

Sender control module 10 is arranged downstream of the sender 2 and includes a sender data buffer 12 and a sender processor 13. Sender data buffer 12, e.g. a FIFO queue, is connected to the data channel 7 and stores the data sent by the sender 2. Sender processor 13 is connected to and acquires data from the sender buffer 12 and generates control data sent through the secure channel 8.

Receiver control module 11 is arranged upstream of the receiver 3 and includes a receiver data buffer 18, a receiver control buffer 19 and a receiver processor 20. Receiver data buffer 18, e.g. a FIFO queue, is connected to the data channel 7 and stores the data received on the data channel 7. Receiver control buffer 19, e.g. a FIFO queue, is connected to the secure channel 8 and stores the control information received on the secure channel 8. Receiver control buffer 19 may be a physical component or may be implemented by and be inherent to the used protocol. For example, TLS (Transport layer Security) and IPSEC (IPSecurity) protocols have a buffer working in a sequential way, which may implement the receiver control buffer 19.

Receiver processor 20 is connected to and acquires data from both the receiver data buffer 18 and the receiver control buffer 19 and performs the operations necessary for the synchronization with the sender control module 10, as well as the operations for checking the authenticity of the data transmitted in data channel 7, as explained in detail hereinbelow, with reference to FIGS. 3, 4a, 4b and 4c. The receiver processor 20 may also be connected to the receiver 3 for sending thereto error messages, in a not shown manner. In alternative, error messages may be sent to an administration server (not shown) which can take suitable measures.

The sender control module 10 and the receiver control module 11 may be implemented as physical nodes or as software applications that are performed by already existing resources of the LANs 5, 6 or the network 4.

Figure 2:
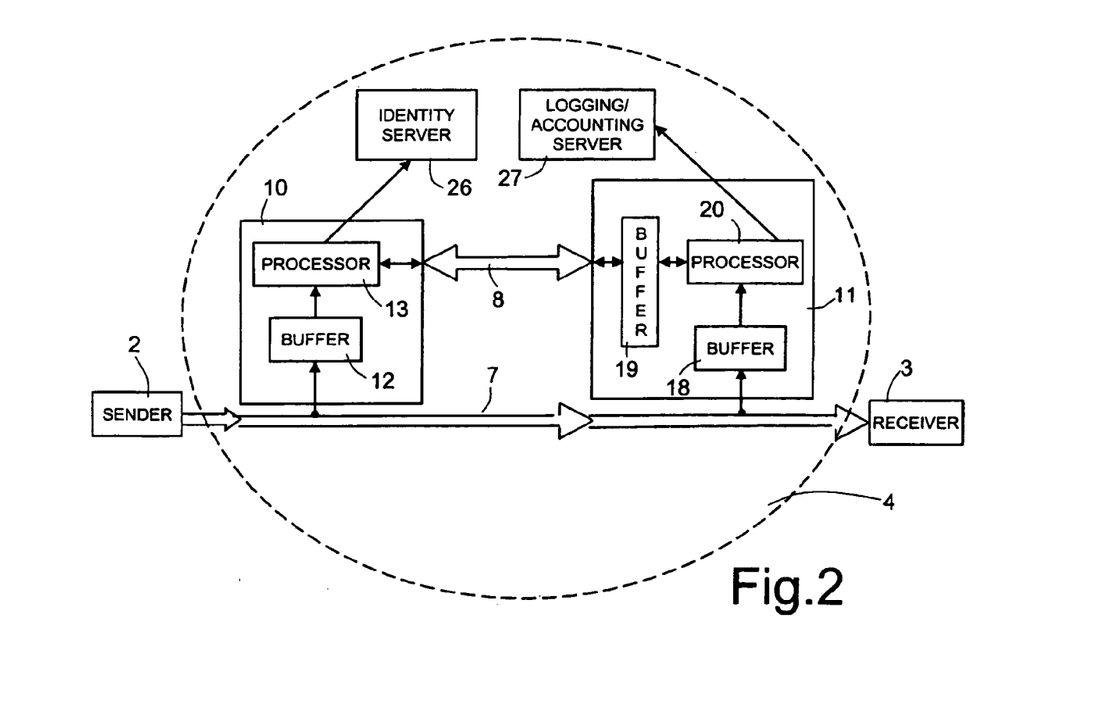
FIG. 2 shows a block diagram of an authentication system according to a second embodiment of the present invention.

FIG. 2 shows a different embodiment, wherein the sender control module 10 and the receiver control module 11 are arranged within the transport and interconnection communication network (backbone). For example, a telecommunication operator may offer an authentication and integrity service for data streams, by inserting the sender and receiver control modules 10, 11 within its infrastructure. For instance, the sender 2 and receiver 3 may be VoIP telephones connected to Internet through ADSL (Asymmetric Digital Subscriber Line) access networks.

In detail, the sender 2 and the receiver 3 are two communication nodes connected to the public network 4; processor 13 of sender control module 10 is connected to an identity server 26; and processor 20 within the receiver control module 11 is connected to a logging/accounting server 27.

The identity server 26 allows the processor 13 of the sender control module 10 to identify the sender 2 who is generating the data stream, for example by mapping the IP address used for transmitting packets in an ADSL (Asymmetric Digital Subscriber Line) access network. The logging/accounting server 27 has the aim of taking into account the various events, such as the authentication errors and the processing accounting data.

The sender control module 10 and the receiver control module 11 can have similar operational function to those of the same elements in FIG. 1; thus, the operation of the two systems will be described hereinbelow for both systems.

Figure 3:
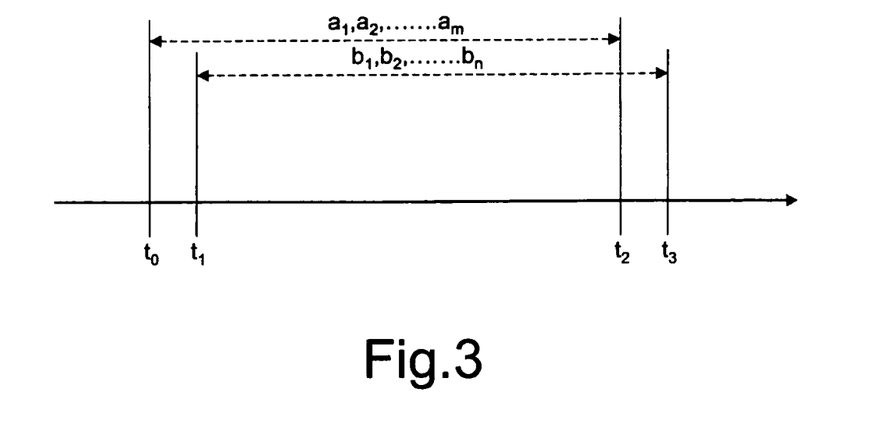
FIG. 3 is a time diagram of a transmission between a sender and a receiver.

In the following description, it is assumed that the sender 2 begins a transmission toward the receiver 3 at a certain initial time and sends a stream of data of such a length that the sender 2 and the receiver 3 are simultaneously engaged in the communication, i.e., for a large portion of the transferring of the information from the sender to the receiver, the receiver receives the data while the sender is still transmitting. This implies that the sender 2 begins the transmission at a time not known to the receiver 3 and the receiver 3 begins receiving the transmitted data when the sender 2 is still transmitting. Such a situation is depicted in FIG. 3, wherein at time t0 the sender 2 begins the transmission of a data stream including bytes [$a_1$, $a_2$, ... $a_i$, ..., $a_M$]; at time t1>t0 the receiver 3 begins receiving a data stream including bytes [$b_1$, $b_2$, ... $b_j$, ..., $b_N$]; at time t2>t1 the sender 2 ends the transmission of bytes [$a_1$, $a_2$, ... $a_i$, ..., $a_M$] (i.e., after sending byte $a_M$); and at time t3>t2 the last byte $b_N$ is received by the receiver 3.

The present authentication method is aimed at verifying that [$a_1$, $a_2$, ... $a_i$, ..., $a_M$]=[$b_1$, $b_2$, ... $b_j$, ... $b_N$], but for a number of errors which are allowed by the system (e.g., loss or deterioration of a limited number of bytes defined by the system to be allowable). Such errors can be detected and signalled by the authentication method. To this end, the data stream generated by the sender 2 is transmitted unaltered through the data channel 7.

In addition, the sender control module 10 divides the stream sent by the sender 2 into a plurality of blocks $A_s$=[$a_s$, ..., $a_{s+L}$], each block comprising L message units, e.g. four message units, calculates an authentication value for each block and sends the authentication value through the secure channel 8 to the receiver control module 11. Here, the term "message units" refers, in general, to bytes; however, in packet-like transmissions, it may refer to packets. For the sake of simplicity, in the following description, reference will be made to byte, unless differently specified.

The authentication value of each block is calculated using a hash function H. As known, a hash function is a transformation that generates a fixed size string which is "hard to invert" (that is, given a hash value h, it is computationally infeasible to find an input x such that H(x)=h) and is collision-resistant (that is, it is computationally infeasible to find two inputs x, y, such that H(x)=H(y)).

The receiver control module 11 divides the stream received through the data channel 7 into blocks, calculates an own authentication value from the received blocks and compares the own authentication value with the authentication value received through secure channel 8 to check the integrity of the received blocks.

In order to allow transmission of data stream of unknown length, sent at an unknown time by the sender to the receiver, according to one aspect of the invention, the sender and the receiver control modules 10, 11 perform a synchronization phase, as below discussed in detail hereinafter, with reference to the flow chart of FIG. 4a-4c, as well as to FIGS. 1, 2. In particular, FIG. 4a refers to the operations performed by the sender control module 10 and FIGS. 4b and 4c refer to the operations performed by the receiver control module 11.

Figure 4A:
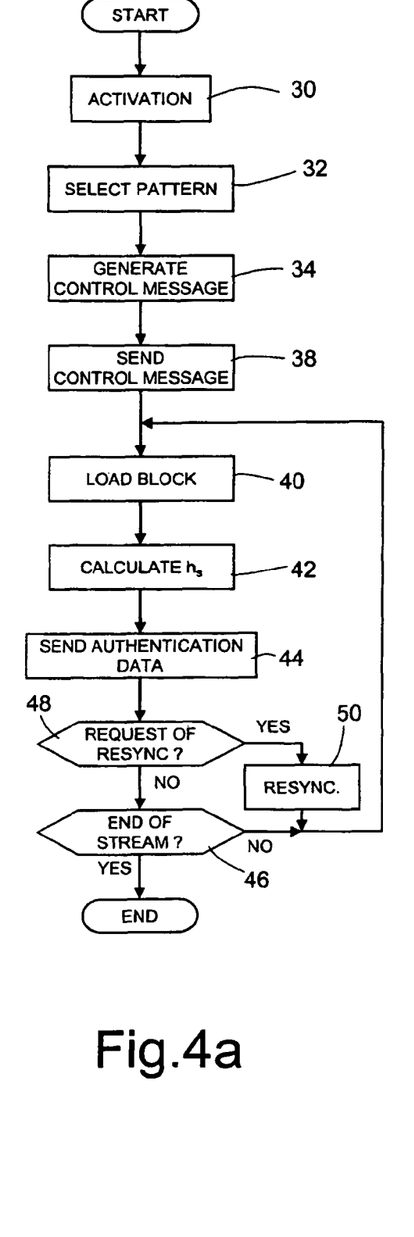
FIGS. 4a, 4b and 4c are flow-charts of an embodiment of the authentication method according to the present invention.

In FIG. 4a, the sender control module 10 is activated as soon as it becomes aware of the transmission of a data stream [$a_1$, $a_2$, ..., $a_M$], step 30; then the data stream is forwarded, unchanged, on the data channel 7 and is simultaneously duplicated and loaded in the sender buffer 12. In the alternative, the data stream may be copied into the sender buffer 12 at any suitable time. After the accumulation of $\underline{m}$ bytes, the sender processor 13 extracts a subsequence of $\overline{k}$ consecutive bytes P1=[$a_k$, ..., $a_{k+p}$], called a pattern, with k+p<m, wherein p is a fixed number independent from $\underline{m}$ (for example, $\underline{p}$=1024), step 32.

The pattern P1 is preferably selected so as to minimize the probability that the pattern P1 is equal to another subsequence of the stream. Selection of the pattern depends also on the traffic type; in particular, the pattern may be a sequence of data/byte whose length reduces the likelihood of a collision. According to a preferred embodiment, the sender processor 13 extracts a sequence of bytes of relatively large size (e.g., 8 packets of 500 bytes) from the first blocks to be verified by the authentication system so as there is a very small likelihood of collision.

The sender processor may also check that the selected pattern P1 is not formed only of standard sequences of bytes, e.g., of a string representing a word of a natural language or the like.

Then, step 34, the sender processor 13 generates a first control message containing synchronization data I1, a hash function H and the length L of the blocks. In particular, the synchronization data I1 may be the same selected pattern P1 or any information that univocally identifies the pattern P1. For example, in protocols that associate a number to the messages within a data stream, such as the RTP—Real-Time Protocol—which provides a sequence number, the synchronization data I1 may be the protocol sequence number.

In one embodiment, the control message may include an end command, for example instructing the receiver control module 11 to interrupt the authentication process after a given number N of blocks or after a given time (e.g., after ten minutes) or when receiving a specific command or information.

The first control message [I1, H, L] is then sent onto the secure channel 8, step 38. In particular, the first control message may be transmitted using any of the well known systems (e.g. TLS—Transport layer Security—or IPSEC protocol).

Furthermore, the data stream generated by the sender 2 is divided into blocks $A_s$=[$a_s$, ..., $a_{s+L}$] having the length L sent with the first control message and each block is accumulated in the sender buffer 12.

As soon as a block $A_s$=[$a_s$, ..., $a_{s+L}$] is accumulated in the sender buffer 12, the sender processor 13 loads it, step 40, calculates the hash value $h_s$ thereof using the hash function H sent with the first control message, step 42, and sends an authentication message on the secure channel 8, step 44. In particular, after sending the first control message, the sender processor 13 acquires the block [$a_{k+p+1}$, ..., $a_{k+p+L}$] following the selected pattern.

According to a first embodiment, the authentication message includes the calculated hash value $h_s$. According to a different embodiment, the sender processor 13 sends the hash value $h_s$ together with an authentication token.

The process of acquiring a block, calculating the hash value thereof and sending the authentication message on the secure channel 8 (steps 40-44) can be repeated for the entire stream, thus generating a control stream [$h_s$, $h_{s+L}$, $h_{s+2L}$, ...].

The described steps are then repeated until the transmission of the original data stream ends (output yes of step 46) or until the sender processor 13 receives a request of re-synchronization from the receiver processor 20 (output yes of steps 48). In the latter case, the sender processor 13 receives a second control message similar to the first control message and including new synchronization data I2, referred to a new synchronization pattern P2, the hash function H, and the length L. Then, the sender processor 13 carries out resynchronization, identifying, in the sender buffer 12, the block $B_z$ following pattern P2, block 50 and resumes the transmission procedure from step 42, calculating the hash value of the block $B_z$.

Figure 4B:
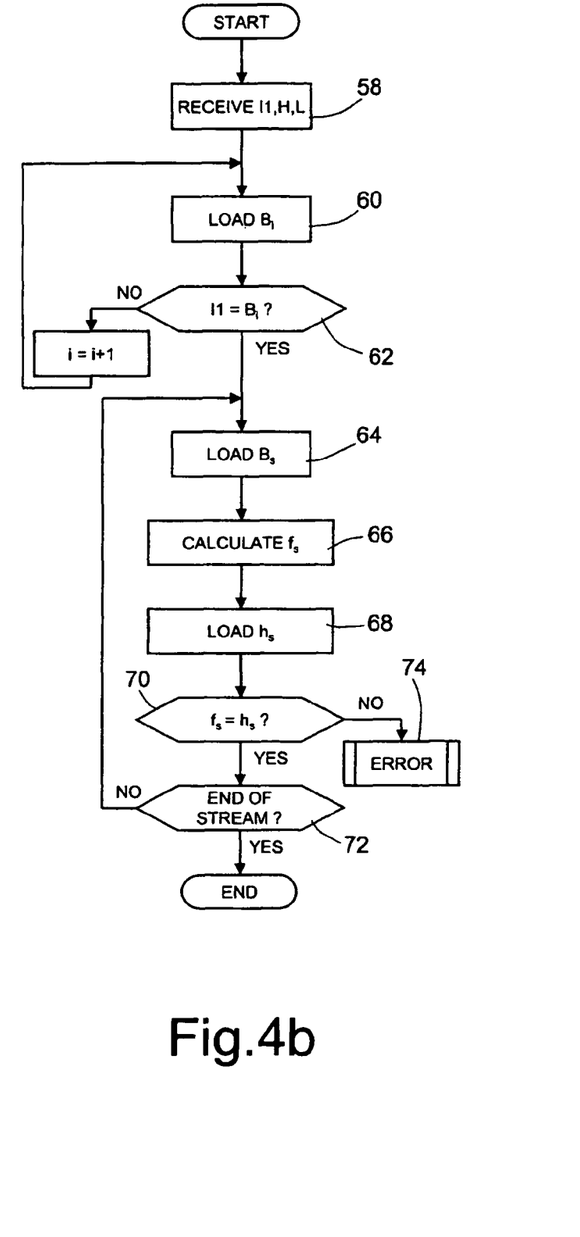

FIG. 4b shows the flow chart of the operations performed by the receiver processor 20, as soon as the receiver control module 11 begins receiving a transmission. In particular, the receiver module 11 can be activated as soon as the first bytes of a data stream $[b_1, b_2, \ldots, b_N]$ are received from the data channel 7.

When the receiver module is activated, the received data stream is accumulated in the receiver data buffer 18. In practice, according to an embodiment, the data stream received from channel 7 and directed to the receiver 3 is duplicated and the duplicated data stream is stored in the received data buffer 18.

As soon as the control message [I1, H, L] is received by the receiver control buffer 19 from channel 8, the receiver processor 20 loads it, step 58; thereafter, the control stream $[h_s, h_{s+L}, h_{s+2L}, \ldots]$ is accumulated in the receiver control buffer 19.

After receiving the first control message, the receiver processor 20 loads the subsequences $B_i = [b_i, \ldots, b_{i+L}]$, with $1 < i < h-L$ and $b_h$ last received byte, step 60, and compares the loaded subsequence with the pattern P1, step 62. In the alternative, if the received synchronization data I1 is a sequence number, as provided for the used protocol, the receiver processor 20 looks for a received block having the same sequence number.

The described steps are repeated until the receiver processor 20 finds a subsequence $B_q = [b_q, \ldots, b_{q+L}]$ that is equal to the pattern P1 (or whose protocol sequence number is equal to the synchronization data I1), output "yes" from the step 62. Now, the receiver module 11 is synchronized with the sender module 10.

Thereafter, the receiver processor 20 loads the block $B_s = [b_s, \ldots, b_{s+L}]$ following the one used for synchronization from the receiver data buffer 18, step 64, calculates the hash value $f_s$ thereof through the received hash function H, step 66, loads the received hash value $h_s$ from the receiver control buffer 19, step 68 and compares $f_s$ with $h_s$, step 70. If the control messages contain an authentication token, this token is checked through standard means, e.g. using symmetrical digital signature based on secrets shared by the sender module 10 and the receiver module 11 (for example, according to the indications of the standard XML-Digital Signature).

If the result of the comparison is positive, that is if $f_s = h_s$, it follows that $[b_s, \ldots, b_{s+L}] = [a_s, \ldots, a_{s+L}]$ and the received block $B_s$ is authenticated. Therefore, the receiver is assured that the received block has been sent by the assumed sender (authenticity of the parties) and it has not been modified during the transmission (integrity of the message).

If the checks in step 70 give positive results, the above procedure (steps 64-70) continues with the following blocks $B_s$ until the end of the data stream (output yes form the step 72), if not (output not from the step 70), an error procedure is implemented (step 74).

The error situation may be managed in different ways, taking into account the type of error. According to a first solution, the receiver may just send an error signalling message both to the login/accounting server 27 (in the embodiment of FIG. 2) and to the sender module 10, without interrupting the transmission. According to a second solution, the system may accept a number of errors before stopping the transmission. According to a third solution, the system may interrupt immediately the transmission.

The first and second solutions may be advantageous when the used transmission channel is known to be defective. This is the case e.g. of networks with very low transmission bands or of wireless networks that are structurally unreliable (for example, IPv4-over-HF network). In this instance, many communications protocols, e.g. all the TCP-based protocols and SIP (Session Initiating Protocol), provide for automatically retransmitting the lost messages. On the other hand, when retransmission is not provided for (e.g. according to UDP-User Datagram Protocol), the system may include an error tolerance. For example, if the communication network is known to loose an average 5% of the sent IP packets, the system may accept a 5% of authentication errors, assuming that such errors are due to transmission errors and not to security problems. Furthermore if, during the transmission, the receiver modules 11 looses its synchronization with the transmitter module 10, a re-synchronizing procedure may be started.

Figure 4C:
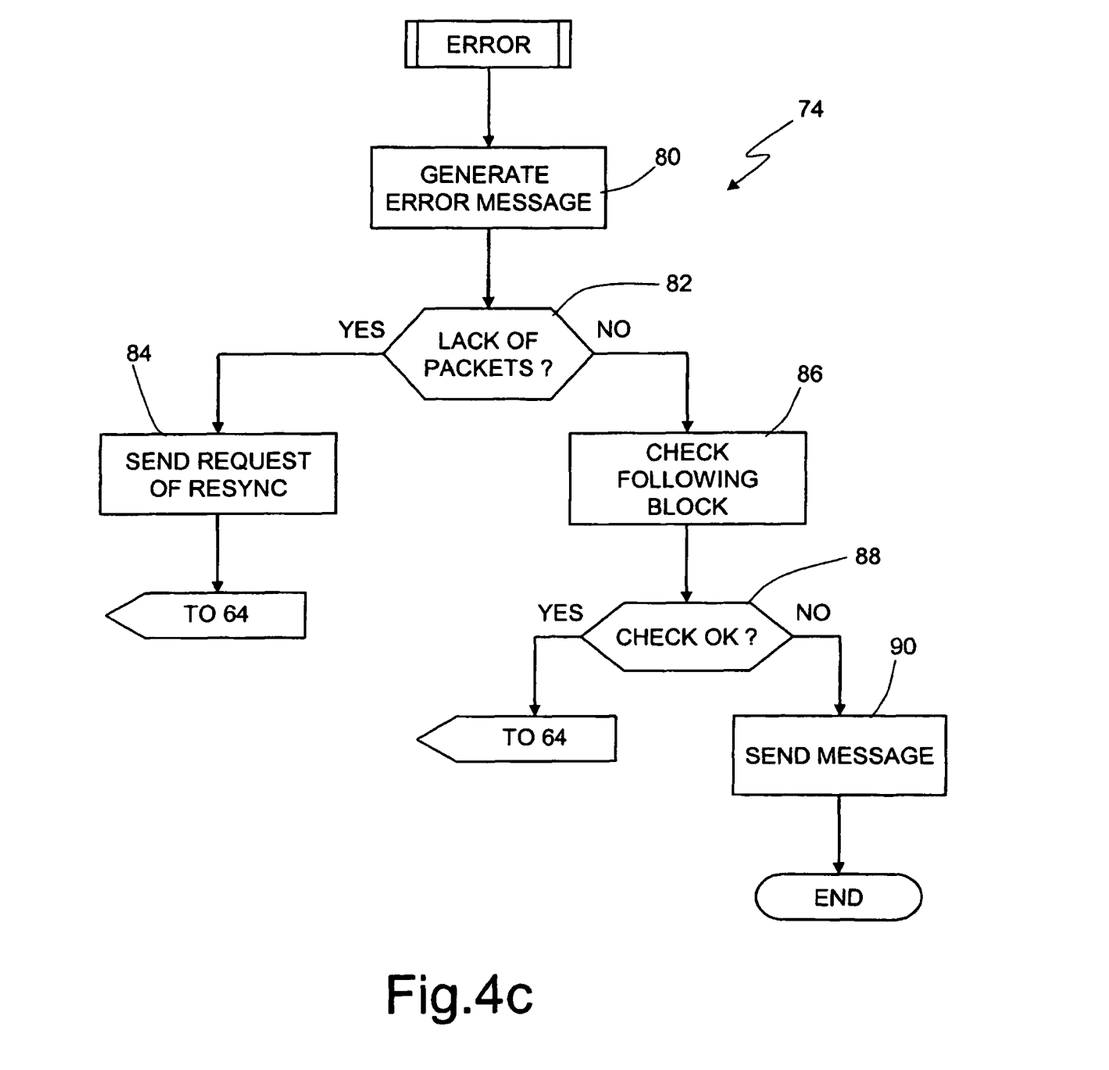

FIG. 4c depicts the flow-chart of a possible error managing procedure, with restart of synchronization.

In particular, initially, the receiver processor 20 generates an error message to its logging/accounting server 27, for the embodiment of FIG. 2 and/or to the sender module 10, step 80. Then, the type of error is checked, step 82, to find out if the error was due to the loss of one or more packets or to a damage in the received data. In particular, if the transmission provides for a sequence number, the sequence number of the received packets may be checked; if the transmission does not provide for sequence numbers, the hash value(s) of the following block(s) is(are) checked.

If the error is due to the loss of packets, output "yes" from step 82, the receiver processor 20 sends a request of resynchronization, step 84. In particular, the request of resynchronization includes control data I2 for a new synchronizing pattern P2, the hash function H and the length L. Then, the receiver processor 20 gets back to step 64 of FIG. 4b, to check a block B, following the one used for generating the control data I2.

If the error is not due to the loss of packets, for example, due to an attack to the data integrity, output "no" from step 82, re-synchronizing is generally not necessary, and the receiver processor 20 may go on and check the following block, step 86. Checking is made as above described, by calculating the hash value and comparing it with the following hash value received on the secure channel 8. If the result of the check of step 86 is positive, output "yes" from step 88, then the standard flow is resumed from step 64 of FIG. 4b; if not, output "no" from step 88, the receiver processor 20 sends an error message to both its server 27, for the embodiment of FIG. 2, and/or to the sender module 10, step 90; then it blocks the packets entering the receiver module 11. The check of the following blocks may be repeated, e.g., a few times, based on the percentage of errors accepted by the system; furthermore, an error message may be sent also after the first detection of an error (before checking a following message in step 86).

Figure 5:
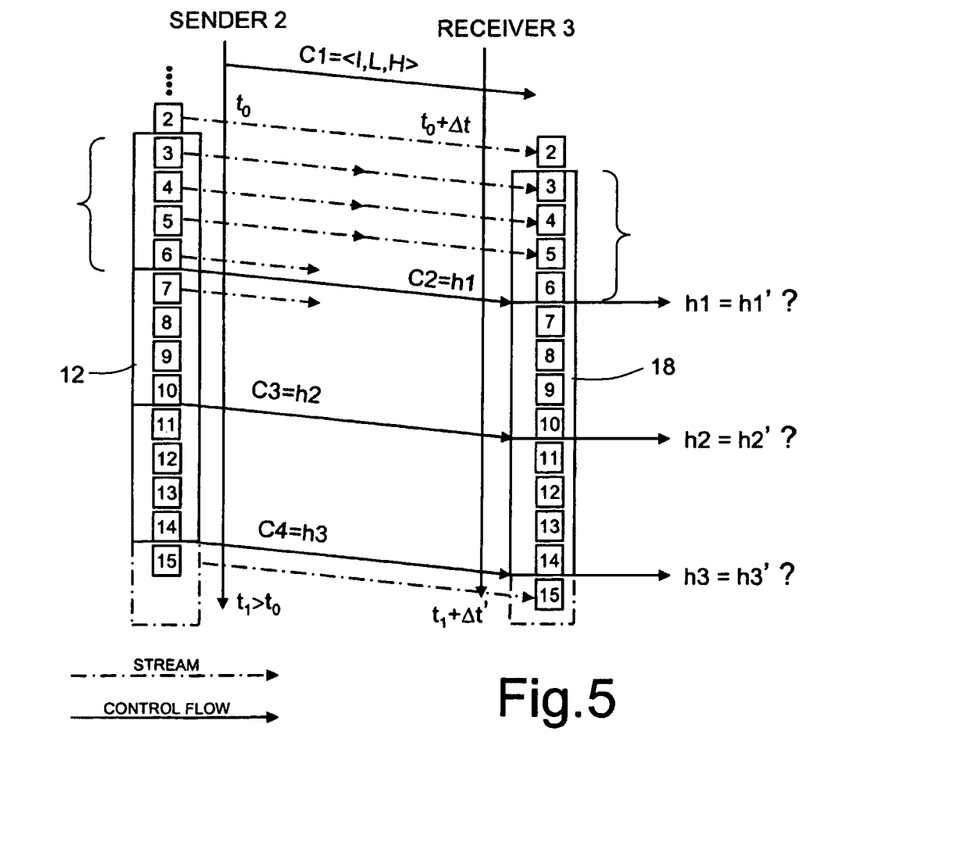
FIG. 5 depicts a possible stream flow between a sender and a receiver, according to an embodiment of the present method.

FIG. 5 shows the flow of exchanged data in a communication based on a RTP protocol, wherein each message (packet) has an own sequence number. Thus, here the length L sent by the sender module 10 to the receiver module 11 refers to packets. The transmission may regard the images picked up by a surveillance video camera, as sent over an IP network to a control center.

In FIG. 5, at time t0 the sender 2 sends a first packet (message having sequence number 2) which activates the sender module 10. The first packet is thus not authenticated. This packet (as well as the successive transmitted packets) is received by the receiver module 11 with a delay Δt.

After having received the first packet, the sender processor 13 activates the authentication procedure and sends a first control message C1=<I,L,H> in the secure channel 8. In the example, the synchronization data I is the sequence number of the RTP message (here 2), L=4, and the hash function is H=SHA-256. Furthermore, the sender module 10 begins to load its buffer 12 with the packets in the order they are sent and, after loading four packets (first block), calculates the hash value h1 for the first block. Then, the sender processor 13 sends the hash value h1 onto the secure channel 8.

In the meantime, the receiver module 11 has received the first control message C1 and begins receiving and loading its data buffer 18 with the received packets. As soon as the receiver module 11 has received the communicated number of packets forming a block (here, four), the receiver processor 20 calculates the hash function thereof, h1'. Then, the receiver processor 20 compares h1 and h1'. If they match, the integrity of packets 3-6 is positively verified.

The process is repeated for packets 7-10, 11-14, . . . , until the end of the stream.

The system and method as described have the following advantages.

The sender and the receiver do not require any adaptation, since the original data stream is not modified, thereby allowing authentication of data also in legacy applications.

The method may be applied to all the packet-type communication protocols, both for discrete and continuous data streams.

Since the control modules 10, 11 are separated from both the sender and the receiver, they can be implemented in a modular and flexible way, as additional components, according to the particular security policy.

The described solution does not introduce any delay to the transmitted data stream, since the transmission of the authentication data is effected on a parallel channel, without interfering with the elaboration of the original data stream. This aspect is particularly important for real-time transmission, which cannot be authenticated by methods requiring the modification of the original stream.

Finally, it is clear that numerous modifications and variants can be made to the present method and system, all falling within the scope of the invention, as defined in the appended claims.

In particular, the synchronization message exchanged between the sender module 10 and the receiver module 11 may not contain the hash function H and the length L, if the system provides for a single hash function H and length L (for example, they are wired in the system), and/or may contain additional information, such as a sender module identifier and the authentication token, to prove its identity.

Moreover, the synchronization data I may include different data, for example non-contiguous portions of a pattern, a sender identification information and the like.

The error procedure may also be different from the described one, and include immediate interruption of the transmission, requests of resending lost packets, and so on.

If the stream of data does not contain a high number of data, authentication may be carried out datum by datum, without dividing the stream of data into blocks.

The invention claimed is:

1. A method for out-of-band authentication of data streams transmitted over a communication network comprising a sender, a receiver, a sender control module, and a receiver control module, comprising the steps of:
    transmitting a first stream of data over a first channel connecting the sender with the receiver;
    receiving, by said sender control module, said first stream of data from said sender;
    extracting, by said sender control module, a first pattern from said first stream of data, said first pattern comprising a sequence of message units from said first stream of data;
    generating authentication data of said first stream of data by said sender control module based on said first pattern extracted from said first stream of data;
    transmitting said authentication data from the sender control module to the receiver control module over a second channel connecting the sender control module with the receiver control module;
    checking authenticity of a second stream of data received over said first channel by said receiver control module using said authentication data;
    exchanging a control message comprising first synchronization data between the sender control module and the receiver control module over said second channel;
    sending, by the receiver control module, a resynchronization request to said sender control module,
    wherein said resynchronization request comprises second synchronization data univocally identifying a second pattern extracted from the second stream of data, and
    wherein the second synchronization data comprises a hash value of said second pattern extracted from the second stream of data.

2. The method of claim 1, wherein the step of exchanging a control message is carried out before transmitting said authentication data.

3. The method of claim 1, wherein said first synchronization data univocally identifies said first pattern.

4. The method of claim 3, wherein the step of checking the authenticity of the second stream of data comprises a synchronization step, wherein the receiver control module looks for said first pattern in said second stream of data on the basis of said first synchronization data.

5. The method of claim 3, wherein said first synchronization data comprises said first pattern or a packet sequence number.

6. The method of claim 3, wherein the step of generating authentication data comprises the step of calculating, by said sender control module, first hash values of first portions of said first stream of data following said first pattern, and the step of transmitting said authentication data comprises the step of transmitting said first hash values over said second channel, and
    wherein the step of checking authenticity of the second stream of data comprises loading into the receiver control module the second stream of data, calculating second hash values for second portions of the second stream of data and comparing said second hash values with received first hash values.

7. The method of claim 6, wherein said control message also comprises a hash function, and wherein said first and second hash values are calculated by said sender control module and said receiver control module using said hash function.

8. The method of claim 3, wherein the step of receiving said first stream of data comprises dividing said first stream of data into first blocks of a fixed length;
the step of generating authentication data comprises calculating hash values of said first blocks; and
the step of checking authenticity of the second stream of data comprises dividing the second stream of data into second blocks of a fixed length, calculating hash values of said second blocks, and comparing said authentication data with said hash values of said second blocks.

9. The method of claim 8, wherein the step of receiving a first stream of data further comprises accumulating said first blocks into a sender buffer;
the step of generating authentication data comprises loading a block of said first blocks from said sender buffer; and
the step of checking authenticity of the second stream of data comprises accumulating said second blocks into a receiver data buffer, accumulating said authentication data in a receiver control buffer, and loading a block of said second blocks from said receiver data buffer.

10. The method of claim 3, wherein said control message further comprises a length information of said first pattern.

11. The method of claim 1, further comprising:
during said step of checking authenticity of the second stream of data, detecting, by the receiver control module, an error between said authentication data and the second stream of data.

12. The method of claim 1, wherein said second channel is a secure channel.

13. A system for out-of-band authenticating streams of data transmitted over a communication network, comprising:
a sender control module comprising a processor configured to receive a first stream of data from a sender and to:
extract a first pattern from said first stream of data, said first pattern comprising a sequence of message units from said first stream of data, and
generate authentication data of said first stream of data based on said first pattern extracted from said first stream of data;
a receiver control module comprising a processor configured to check said authentication data;
a first channel connecting said sender to a receiver, the first channel configured to transmit said first stream of data from said sender toward said receiver; and
a second channel connecting said sender module and said receiver module configured to transmit said authentication data,
wherein said processor of said receiver control module is further configured to send a resynchronization request to said sender control module,
wherein said resynchronization request comprises synchronization data univocally identifying a second pattern extracted from a second stream of data, and
wherein said synchronization data comprises a hash value of said second pattern extracted from the second stream of data.

14. The system of claim 13, wherein said sender control module comprises a synchronization unit including a sender buffer configured to load first portions of the first stream of data and a sender processor configured to extract said first pattern from said first portions and to transmit a control message to said receiver control module over said second channel.

15. The system of claim 14, wherein said receiver control module comprises a synchronization unit including a receiver data buffer configured to load second portions of the second stream of data received over said first channel and a receiver processor configured to receive said control message from said second channel and to receive said second portions from said receiver data buffer, wherein said receiver processor is configured to look for said first pattern from said second portions on the basis of said synchronization data.

16. The system of claim 14, wherein said synchronization data comprises said second pattern or a packet sequence number.

17. The system of claim 15, wherein said sender processor comprises a first calculator configured to calculate first hash values of said first portions following said extracted first pattern and a transmitter element configured to transmit said first hash values on a secure channel and said receiver module comprises a receiver control buffer connected to said receiver processor and said secure channel and configured to load said first hash values, said receiver processor comprising a second calculator configured to calculate second hash values for said second portions and a comparator configured to compare the first hash values with the second hash values.

18. The system of claim 13, wherein said control message also comprises a hash function and wherein said sender processor and said receiver processor are configured to calculate said first and second hash values using said hash function.

19. The system of claim 13, wherein said sender control module is part of a first local area network comprising said sender, and said receiver control module is part of a second local area network comprising said receiver.

20. The system of claim 13, wherein said sender control module and said receiver control module are part of said communication network.

* * * * *